United States Patent [19]
McLendon et al.

[11] Patent Number: 5,479,223
[45] Date of Patent: Dec. 26, 1995

[54] FILM CONVERSION SPROCKET

[75] Inventors: Donald C. McLendon, Houston, Tex.; Robert D. Lipscomb, Santa Rosa, Calif.

[73] Assignee: Duo-Sprocket, Inc., Houston, Tex.

[21] Appl. No.: 434,607

[22] Filed: May 4, 1995

Related U.S. Application Data

[63] Continuation of Ser. No. 11,657, Jan. 29, 1993, abandoned.

[51] Int. Cl.$^6$ .............................. G03B 1/00; G03B 1/24
[52] U.S. Cl. .............................. 352/79; 352/168; 226/76
[58] Field of Search .............................. 352/79, 80, 129, 352/168, 187; 226/76; 242/209; 403/326, 359

[56] References Cited

U.S. PATENT DOCUMENTS

| | | | |
|---|---|---|---|
| 1,229,275 | 6/1917 | Jenkins | 352/241 |
| 1,956,391 | 4/1934 | Küppenbender et al. | 352/80 |
| 1,972,555 | 9/1934 | Fear | 352/132 |
| 2,376,714 | 5/1945 | Mussen | 403/359 |
| 3,179,450 | 4/1965 | Recker | 403/359 |
| 3,507,569 | 4/1970 | Goto | 352/129 |
| 3,865,738 | 2/1975 | Lente | 352/241 X |
| 4,437,782 | 3/1984 | Geisthoff | 403/359 |
| 4,639,163 | 1/1987 | Buthe et al. | 403/359 |
| 4,900,293 | 2/1990 | McLendon | 474/152 |

FOREIGN PATENT DOCUMENTS

| | | | |
|---|---|---|---|
| 0360329 | 4/1906 | France | 352/241 |

OTHER PUBLICATIONS

"Three-perforation at Clarimont," *American Cinematographer*, Dec. 1988.
"Trilent 35 System," *Image Technology*, Jul. 1988.
"Kodak's Coleman on HDTV and the Future of Film," *International Photographer*, Oct. 1988, pp. 16–19.
"Study Group on 30 Frame Film Rate," *International Photographer*, Dec. 1988, at p. 20.
"Television—Merging Multiple Technologies", presented at The 24th Annual SMPTE Television Conference, Jan. 26–27, 1990, Disney Contemporary Resort, Lake Buena Vista, Fla.
"35 mm—The Next 100 Years—3 or 4 PERF, 24 or 30 FPS—An Available Solution For The Dilemma," presented at The 24th Annual SMPTE Television Conference, Jan. 26–27, 1990, Disney Contemporary Resort, Lake Buena Vista, Fla.

*Primary Examiner*—Michael L. Gellner
*Assistant Examiner*—Eddie C. Lee
*Attorney, Agent, or Firm*—Conley, Rose & Tayon

[57] ABSTRACT

A sprocket assembly is provided which allows a film projector or any other film handling device to be readily converted to run film having different perforation-to-frame ratios. The sprocket assembly includes an outer cylindrical sleeve having teeth for engaging the film perforations when the film is run, and an inner cylindrical sleeve adapted to fit within and anti-rotationally mate with the outer cylindrical sleeve. The inner sleeve also has teeth for engaging the film perforations. The inner sleeve is mounted on a rotatable shaft of the projector, and the outer sleeve can be added or removed.

11 Claims, 3 Drawing Sheets

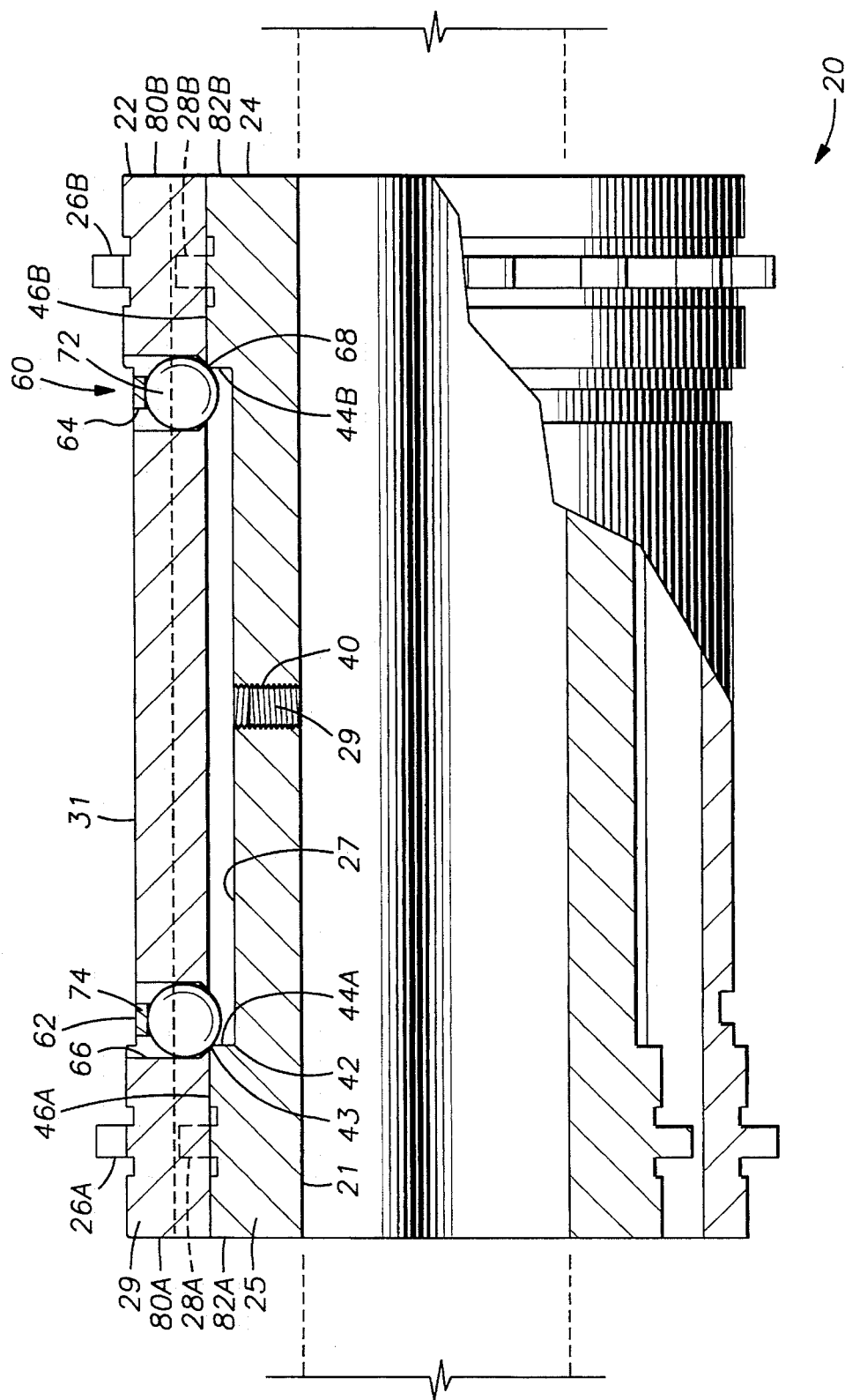

FILM CONVERSION SPROCKET

This is a continuation application of U.S. patent application Ser. No. 08/011,657 filed Jan. 29, 1993, now abandoned.

BACKGROUND OF THE INVENTION

The present invention relates to a sprocket assembly which, when mounted on a film projector or other film handling device, permits the ready conversion of the device to run film having various numbers of perforations per image frame, as the occasion requires.

Conventional 35 mm film projectors and cameras pull down four-perf film. "Four-perf" film signifies that each image frame which carries the visual image corresponds to four perforations along the two side edges of the film. The perforations are all spaced apart the same distance, known as the pitch length. The "pulldown" operation in either production or projection of films involves engaging the perforations on the sides of each image frame with a claw gear and bringing the frames, in sequence, into register with the appropriate apertures for exposure or projection. Four-perf pulldown means simply that to place each image frame in front of the appropriate aperture at the proper time, the four perforations along the sides of each frame are engaged and pulled down together. Currently, longtime worldwide use and acceptance of four-perf pulldown has led to its being the standard format for both production and projection of films.

Historical accident is largely responsible for the advent and current widespread use of four-perf film. The standard film gauge of 35 mm was first introduced by Thomas Edison in 1891 for use in a peep show viewing apparatus developed by his assistant, W. K. L. Dickson. Edison also chose a four-perf, 4:3 ratio frame format, where the visual frame-width to frame-length ratio is 4:3, because it happened to be compatible with this particular peep show viewing apparatus. At that time, Edison gave no thought, apparently, to the format's ever being used in the projection of motion pictures. As it turned out, this 4:3, four-perf frame format was recognized as the world standard by 1907, after the Lumiere brothers of Lyon, France, builders of the first commercially successful projectors, followed Edison's lead by accepting that format for the European film industry.

In early films, the so-called "full aperture" frame format was used. The full aperture format had a 4:3 ratio of frame width to frame length (the length being measured along the longitudinal extent of the film), otherwise known as the 1:33 aspect ratio, and resulted in nearly the entire length of film being exposed or utilized, since there was very little unexposed film between image frames. Thus, each image frame corresponds to nearly four perforations, and the slight gap between image frames filled out the space to the fourth perforation. As a result, one image frame appeared for each group of four perforations. With the addition of sound during the 1920's, the image size on the film had to be reduced to allow room for the sound track to be printed adjacent to one row of perfs, in order to continue to use the four-perf per frame film standard. In order to accommodate the sound track, the image size was reduced in both width and length, maintaining the 4:3 or 1.33 aspect ratio, so that a greater amount of unused or unexposed film was left between image frames. The reduced size, 4:3 ratio frame format is known as the "academy aperture."

To achieve a wider projected image, and thus more closely resemble a theatrical stage, the 4:3 frame format was changed to accommodate projection on a flat, wide screen. In North America, the image size was reduced from the academy aperture and conformed into a 5.5:3 ratio, popularly known as the 1.85 aspect ratio. In Europe, the flat, wide screen frame format was conformed into a 1.66 aspect ratio, which again resulted in an image size smaller than that obtained with the academy aperture. To achieve either the 1.85 or 1.66 wide, flat screen format in a theater from a 35 mm film, two techniques are presently employed: (i) a mask is placed in the projector gate, or (ii) a "hard matte" is used in the camera. In both cases, the 35 mm camera advances the film four perfs at a time, each four perfs corresponding to one image frame. The mask in the projector gate is employed when a camera is used for filming which is adapted to produce an image on the film having a 1.33 aspect ratio, since it is necessary to restrict the height of the 1.33 frame when projecting onto a screen requiring a 1.85 or 1.66 frame. The mask in the projector gate cuts off the unnecessary top and bottom portions of the 1.33 image so that it will fit the 1.85 or 1.66 image format. On the other hand, the "hard matte," which is also a type of mask, in the camera is used to record a photographic image which has the correct wide screen ratio. The mask in the camera results in a wide, unexposed portion of film between each frame and the adjacent frames.

With either of the above two techniques for obtaining the correct 1.85 or 1.66 aspect ratio image, the amount of film used is of the order of one-third greater than the combined length of the photographic images and the required spacing between images, assuming, again, that 4-perf pulldown is employed. In other words, about 25% of each film is presently not being used, and thus only 75% of the length of film carries the visual image. This excess film results in unnecessary expense for buying, processing, editing, and printing of the film used for motion pictures, as well as extra expense for storage, shipping, handling, and the like.

Another wide-screen film technique known as Cinemascope was introduced in the early 1950's. Cinemascope achieved a 2.35 aspect ratio through the use of anamorphic lenses, which squeezed the image into the 4:3 academy aperture frame in production, and subsequently unsqueezed it in projection onto a wide, curved screen. Normally a 4-perf pulldown 35 mm camera with a 2:1 anamorphic optical system would be used in filming. This system reduces the horizontal component of the scene which is recorded on the film. The projector uses a complementary 2:1 anamorphic optical system such that the horizontal component of the image is increased to conform the proportions of the projected image to those of the scene filmed. Presently, the flat, wide screen format is more popular and widely used than the anamorphic 2.35 format.

For the last fifteen years or so, there have been proposals in the film industry to convert from 4-perf production, which is now the industry standard, to other perf to image frame ratio production in order to eliminate the 25% of each film which is wasted, as referred to above. In other words, if the perforation spacing or pitch length were to remain the same, which it must for all practical purposes, a film using fewer perf pulldown, having fewer perfs corresponding to an image, is shorter than it would be using 4-perf pulldown, which has 4 perfs per frame, because less space is wasted between individual visual frames. One such proposal is found in U.S. Pat. No. 3,865,738, issued Feb. 11, 1975, to Lente. The Lente patent discloses means for producing 3-perf visual frame films for flat, wide screens or anamorphic, curved wide screens. With the recent advent of production equipment that easily converts from 4-perf to 3-perf, and with the introduction of new film stocks that will facilitate 3-perf editing, the remaining stumbling block to industry-wide conversion to 3-perf or even smaller perf films is the inability to convert cinema projectors easily and inexpensively to accept 3-perf or 4-perf release prints. Additionally, other ratios for reducing the amount of wasted film space are contemplated, including 2½ perf per frame. It is contemplated that cinematography suppliers may introduce numerous changes in the frame to number of perforation standard in an effort to optimize picture quality and simultaneously minimize the amount of wasted, non-imaged film space between image frames.

Currently, worldwide standard projection systems use a relatively heavy feed sprocket and hold-back sprocket, a lighter-weight intermittent sprocket between the feed sprocket and hold-back sprocket, and constant-speed sprockets associated with the accompanying sound track. These sprockets are all sized and run at the appropriate speed in order to project 24 frames per second ("fps") with a 60-cycle power supply, or 25 frames per second with a 50-cycle power supply. At a 24 fps projection rate, with 4-perf films using the worldwide standard pitch length, precisely 90 feet of film are run per minute.

If other perforation to visual frame ratio films were to be produced and made available to cinema houses, modifications would have to be made to the projectors in order to project those films. The object with these other perforation to visual frame ratio films will be to project at a rate of 24 fps, and since the sprocket shafts on the conventional projectors do not change their rates of rotation, changes in sprocket sizes would be necessary in order to effect the proper film running rate. By decreasing the number of perfs per visual frame, both the amount of wasted space between visual frames, and the overall length of film needed per time unit of filming or projecting, are reduced.

For example, in order to project 24 fps of 3-perf film, precisely 67.5 feet of film would have to be run per minute. One way to effect the 67.5 feet-per-minute running rate required for 3-perf film projection would be to replace the sprockets used for 4-perf films with sprockets having only 75% of the diameter of the larger 4-perf sprockets, with the pitch length remaining the same. In one conventional projection system for 35 mm, 4-perf films, the 4-perf sprockets have 16 teeth around their circumferential peripheries on each end. Because the teeth on the projector sprockets must always have the same pitch length no matter whether 4-perf or 3-perf film is being projected, the 3-perf sprockets for this conventional system, being sized at 75% of the diameter (and, thus, the circumference as well) of the larger 4-perf sprockets, would have only 12 teeth around their circumferential peripheries at each end. Conversion of projectors involving removal of the 16-tooth sprockets (or any larger sprocket) and replacement with smaller 12-tooth sprockets (or any smaller sprocket), is a time-consuming, relatively expensive process, however, and after conversion to the smaller 3-perf sprockets the projection equipment could not be used to run 4-perf films. Conversion from 4-perf to 3-perf pulldown, and back again, depending on whether the film to be shown is 4-perf or 3-perf, is cumbersome, slow, expensive, and would simply not be feasible with existing equipment. This would be even more cumbersome where multiple perforation to frame standards are used in the industry, such as 2½ perfs per frame, or other ratios. See, e.g. "Study Group on 30 Frame Film Rates," International Photographer, December, 1988, at p. 20.

One adapter system which allows use of different perf films on a single projector is disclosed in U.S. Pat. No. 4,900,293, McLendon, the disclosure of which is fully incorporated herein by reference.

Another significant savings with use of 3-perf film is potentially available in conversion of film to video. Video is run at a scanning rate of 30 fields per second, not at the presently used film rate of 24 frames per second. Video which is produced from film must be specially processed to correct for these differences in rate. A desirable alternative to such special processing would appear to be to produce and project films at 30 fps. Production of videos from 30 fps films would not involve such special processing. Such an increase in film production and projection rates would, however, increase the amount of film used in a motion picture by 25%. With 3-perf film, even with an increase in production and projection rates to 30 fps to be compatible with video, film usage would still be less than with 4-perf film running at the standard 24 fps. Three-perf film running at 30 fps uses 84.375 feet of film per minute. compared with 90 feet per minute for 4-perf film running at 24 fps. These same relative film savings of about 6% will accrue whether one is using 3-perf film to produce standard video or High Definition TV. The latter is expected to become increasingly popular. Additional savings can be anticipated if lower perf to video frame ratios become popular, such as 2½ perfs per frame.

The conversion sprocket disclosed in U.S. Pat. No. 4,900,293, McLendon, employs a two sprocket system having a 12 tooth first sprocket which connects directly to the projector shaft for showing 3-perf film and a second 16-tooth sprocket which mounts on the 12 tooth sprocket for showing 4-perf film. A set screw may be used to attach the 12-tooth sprocket to the projector shaft, and a second set screw is used to lock the 12-tooth sprocket to the 16 tooth sprocket. This system provides an effective reliable conversion between 3- and 4-perf film, but it does have two minor drawbacks. As shown in the patent, the inner surface of the outer, 16-tooth sprocket, has a plurality of grooves to receive the individual teeth of the 12-tooth inner sprocket. This profile for the ID of the outer sprocket involves a good deal of machining and is therefore relatively expensive to manufacture. Also, where a change inn sprockets is required, either from the 4-perf to the 3-perf or vice versa, the second set screw must be tightened or loosened, as the case may be. In addition to the time required for the operator to perform this task, the operator must keep an allen wrench (or the like) with him, or with the equipment, for actuating the set screw.

Thus, it will be appreciated that it would be advantageous to provide a releasable interlocking means for the inner and outer sprockets which is cheaper to manufacture than the device disclosed in the '293 patent, but just as effective, and it would also be advantageous to eliminate the need for using hand tools to effect a sprocket change.

SUMMARY OF THE INVENTION

The present invention solves the problems discussed above in connection with prior art film production and projection systems and will enable the film industry to capture the potential vast cost savings referred to previously by providing a device which will allow fast, fairly simple, relatively inexpensive changeovers in existing projection equipment, once modified with a one-time conversion to allow use of the smaller (e.g., 12-tooth, 10-tooth or other size) sprockets, to accommodate either 4-perf or the new perf per image frame films. For each new perf to image frame film, the film user need only have on hand the proper size sprockets adaptable with the present invention which will run the film at the required frames per second speed. The one-time conversion to the multiple sprockets will enable the projection equipment to run the 3-perf or other perf to visual frame films, as well as standard 4-perf films. The present invention will allow an easier change to be made between sprockets to permit the same equipment to run 4-perf, 3-perf, 2½-perf or other type films.

The present invention includes a sprocket assembly for a film projector or other film handling device which has an outer cylindrical sleeve having a set of sprocket teeth with standard film industry pitch length and conventional shape or profile around its circumference at each end, each set of teeth being designed to engage the film perforations or perfs on either side of the film in order to run the film through the projector or other film handling device. An inner cylindrical sleeve is adapted to fit within the outer sleeve. The inner sleeve also has a set of sprocket teeth around its circumference at each end for engaging the film perforations to run the film, the inner sleeve teeth also having a conventional shape or profile and standard pitch length.

Preferably, the teeth on the inner sleeve mate with a plurality of grooves or splines on the inner surface of the outer sleeve. The result is that both sleeves are rotationally locked together, and rotation of one causes rotation of the other. For example, where the inner sleeve drives a 2½-perf per frame film, and the diameter of the outer sleeve is sized to drive a 4-perf film, the circumference of the outer sleeve is 8/5 that of the circumference of the inner sleeve. Because the teeth are spaced apart the same distance as the film perforations, the outer sleeve will have 8/5 as many teeth as the inner sleeve. When rotated at the same shaft speed, e.g., when mounted on a shaft in a projector, the outer\inner sprocket combined assembly will engage 8/5 as much film in a given time period as the inner sleeve alone. The inner sleeve alone, when mounted on a conventional projector and run at conventional shaft speed, will run 56.25 feet of film per minute, corresponding to the 2½-perf projection rate. When the outer sleeve is installed on the inner sleeve, the combination of the inner and outer sleeves, with the outer sprocket engaging the film, will run 90 feet of film per minute if shaft speed remains the same, corresponding to the 4-perf projection rate. Likewise, where the inner sleeve is configured for 3-perf, and the outer sleeve for 4-perf, the outer sleeve is 4/3 the circumference of the inner sleeve and has 4/3 as many teeth as the inner sleeve.

The invention will now be described in greater detail with reference to the accompanying drawings.

BRIEF DESCRIPTION OF THE DRAWINGS

FIG. 4 is a longitudinal sectional view of the interconnected sprockets of FIG. 1 at section 4—4.

DESCRIPTION OF THE PREFERRED EMBODIMENTS

Figure 1:
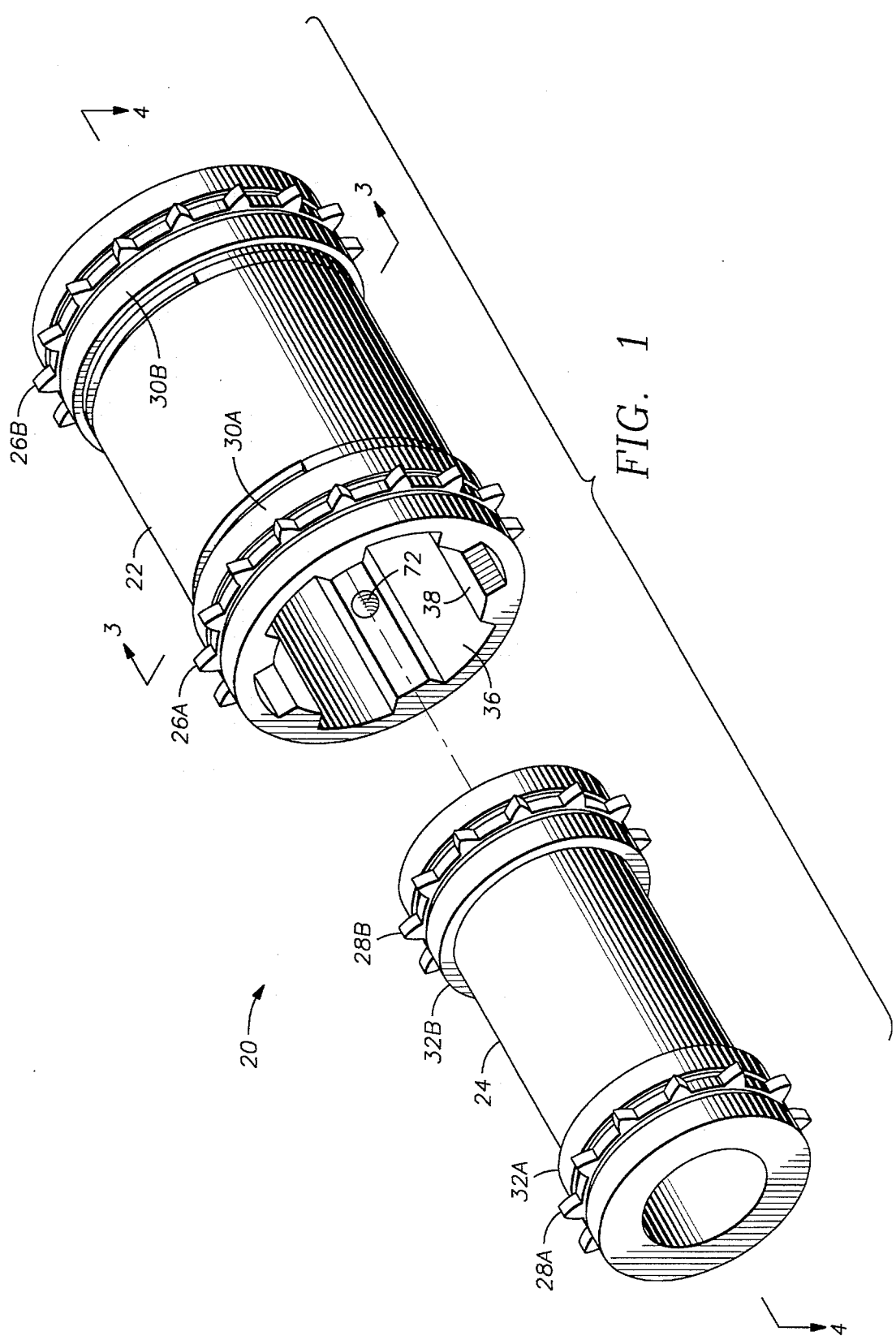
FIG. 1 is an isometric exploded view showing an inner and outer sprocket of the present invention.

Referring now to FIGS. 1–4, there is shown a preferred embodiment of the sprocket assembly of the present invention, indicated generally at 20. Sprocket assembly 20 includes an outer sleeve 22 and an inner sleeve 24, each having means for engaging standard movie film perforations, such as 35mm film perforations, when the film is run through the projector or other film-handling device. Such means includes two sets of teeth 26A, 26B, and 28A, 28B, around the circumference of sleeves 22, 24, respectively, at their ends. Such means further includes a pair of collars 30A, 30B on outer sleeve 22, and a pair of collars 32A, 32B on inner sleeve 24, each collar forming a base for one of the sets of teeth 26A, 26B and 28A, 28B. The collars are preferably integral with the bodies of sleeves 22, 24. The teeth of sets 26A, 26B, 28A, 28B are preferably all of conventional shape and preferably have a pitch length equal to the present film industry standard. The outer diameter of collars 30A, 30B may be, for example, ⅔ the diameter of collars 32A, 32B and thus sprocket assembly is adapted for use with 3-perf and 4-perf pulldown systems. Thus, the circumference of collars 30A, 30B is 4/3 that of collars 32A, 32B. Since the pitch length of the teeth on outer sleeve 22 is the same as that of the teeth on inner sleeve 24, there are 4/3 the number of teeth on outer sleeve 22 as on inner sleeve 24. When outer sleeve 22 is mounted on inner sleeve 24 and the combination is mounted on a projector shaft such that outer sleeve 22 is engaging film perforations during the running of film, it can be seen that at the same rate of shaft rotation, 4/3 as much film is run as when inner sleeve 24 alone is used, i.e., without outer sleeve 22. Outer sleeve 22 is adapted for use with 4-perf film, and inner sleeve 24 for 3-perf film.

The inner sleeve 24 has a relatively heavy, substantially solid body 25 of steel or other suitable material with a reduced O.D. mid-portion 27. Reduced O.D. mid-portion 27 is adapted to be spaced from the film surface as the film travels by on sleeve 24, so that the images on the film will not be damaged by engagement with the surface of the sleeve. Outer sleeve 22 has a relatively heavy body 29 of steel or other suitable material and it, too, has a reduced O.D. mid-portion 31 to space the sleeve's surface from that of the film as the film is passed along the sleeve.

The teeth in the sets 26A, 26B and 28A, 28B are, as mentioned above, spaced the same distance apart as the perforations on the edges of the film for which sprocket assembly 20 is to be used. For conventional films, that distance will be the standard industry pitch length, as referred to above. It should be understood, however, that other pitch lengths could be used, and the teeth on sleeves 22, 24 would then be spaced according to that other pitch length. Similarly, the longitudinal distance between the sets of teeth 26A and 26B, and the longitudinal distance between the sets of teeth 28A and 28B, is substantially the same as the width of the film between the perforations on the edges of the film. Again, for standard films that distance will be set, but any other distance could be used. The longitudinal extent or length of sleeves 22 and 24 is substantially the same as the width of the film to be run with sprocket assembly 20. Thus, sets of teeth 26A, 26B and 28A, 28B are aligned to engage the film perforations in sequence as pulldown occurs.

To secure inner sleeve 24 on a projector shaft, inner sleeve 24 includes a through bore 21 sized to snugly receive a projector shaft (not shown), or the shaft of other film handling equipment. A threaded bore 40 is disposed radially through body 25 extending between reduced O. D. mid-portion 27 and shaft bore 21. A set screw 29, preferably having an Allen wrench head, is disposed within threaded bore 40 and seats against a projector shaft to secure inner sleeve 24 thereto and prevent movement of inner sleeve 24 with respect thereto.

At the intersection of collars 32A, 32B and reduced O.D. mid-portion 27, a radius 42 is provided to provide a smooth transition between the inner annular surfaces 44A, 44B of collars 32A, 32B and surface 27. The intersection of outer faces 46A, 46B of each collar 32A, 32B from which teeth 28A, 28B extend, and annular surfaces 44A, 44B is also formed as a radius 43.

Inner sleeve 24 and outer sleeve 22 are designed to be interconnected to rotate together. As indicated in FIG. 1, inner sleeve 24 is adapted to be telescoped into a bore 36 in outer sleeve 22, which may be inserted over the inner sleeve, and secured thereon, after inner sleeve 24 is secured to the projector shaft. To prevent rotation of outer sleeve 22 with respect to inner sleeve 24, a series of evenly-spaced splines 38 are disposed about the periphery 41 of bore 36.

In this preferred embodiment, inner sleeve 24 is configured to run 3-perf film, and thus includes 12 sprocket teeth 28A, 28B on collars 32A, 32B. To effectively secure sleeves 22, 24 together and prevent intermittent chatter, or minute rotational movement therebetween, the inner periphery of outer sleeve 22 is preferably provided with a plurality. e.g., six, of splines 38. Each spline 38 extends substantially parallel to the longitudinal axis of outer sleeve 22 along the entire length of sleeve 22, and is preferably equally spaced from each adjacent spine 38. According to one embodiment of the invention, there are one-half the number of splines 38 as the number of teeth in each set 28A, 28B. There may be fewer splines, and they may be spaced other than equally, as long as the desired anti-rotational effect is achieved. For example, a smaller number of splines 38 may be provided, leaving some teeth 28A, 28B free of contact with a spline 38. It is believed that the desired anti-rotational effect could be achieved with as little as one spline. It is preferred, however, to use a number of splines equal to one-half the number of teeth on inner sleeve 24.

To provide secure anti-rotational movement of inner sleeve 24 and outer sleeve 22, each spline 38 is provided with opposed side walls 48A, 48B, which extend inward from the inner periphery 41 of outer sleeve 22, and terminate at an inner face 50. The arc length 52 across the inner face 50 of each spline 38 is preferably slightly less than the arc length between the base of adjacent teeth 28A, 28B on inner sleeve 24. Inner face 50 is a concave arc, conforming to, and greater smaller in diameter than, the outer diameter of the collars 32A, 32B on inner sleeve 24. Preferably, the diameter defined along the inner faces 50 of each spline 38 is about 0.001 inches greater than the outer diameter of the collars 32A, 32B on inner sleeve 24. Additionally, the eccentricity between the diameter formed about the bore 36 of outer sleeve 22 and the root diameter on collars 30A, 30B should be no more than 0.0001 inches. These tolerances will allow interchangability of sleeves 22, 24 while maintaining a continuous feed rate of film through the projector with minimal discontinuity caused by eccentricity in the sprocket 20. Thus, the engagement of spline 38 between any two adjacent teeth 28A or 28B on inner sleeve 24 is a snug fit, created by engagement of side walls 48A, 48B between the root and crown of adjacent teeth 28A, 28B which provides tight anti-rotational engagement therebetween. As the arc length of the inner face 50 is slightly less than the arc length along the root of adjacent teeth 28A, 28B, a gap will exist between side walls 48A, 48B and the sides of the adjacent tooth 28A, 28B adjacent the root and crown of the tooth 28A, 28B. In the preferred embodiment with a twelve tooth inner sleeve 24, each of the six splines 38 are equally spaced around periphery 41, and thus each tooth 28A or 28B is engaged against a side wall 48A, 48B of one of splines 38 on only one side of the tooth 28A, 28B, and the other side of the tooth is unloaded. To align the splines 38 and teeth 28A, 28B, and ensure that the side walls 48A, 48B of splines 38 engage teeth 28A, 28B between the root and crown thereof, each side wall 48A of one spline is parallel to the next adjacent side wall 48B on the next adjacent spline. Splines 38 are preferably machined into periphery 41 by broaching out the space between splines 38 about periphery 41, to form sides 48A, 48B and face 50. This is a relatively fast, simple, and inexpensive manufacturing process.

Figure 3:
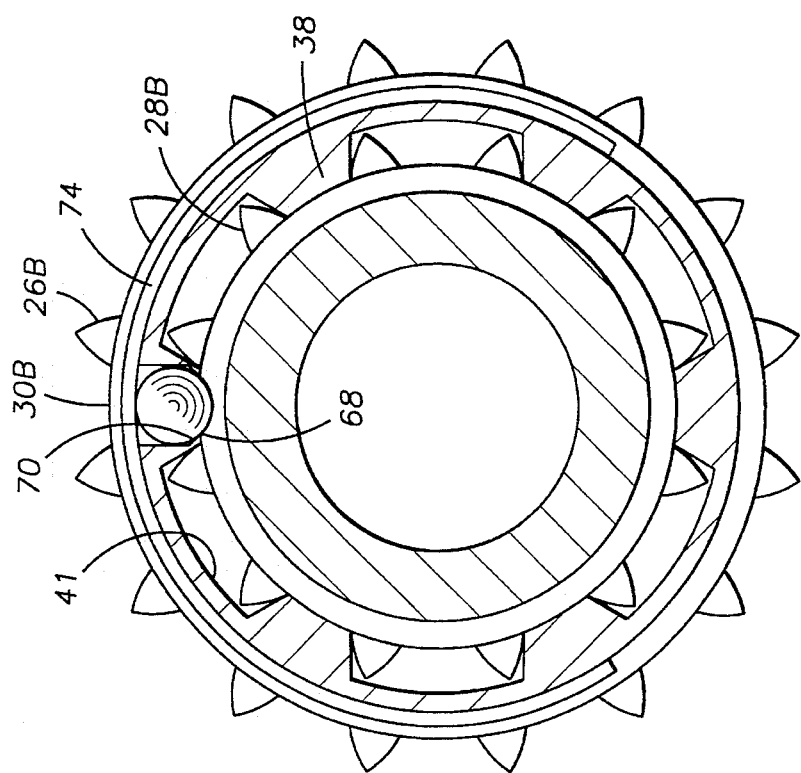
FIG. 3 is a transverse sectional view of the interconnected sprockets of FIG. 1 at section 3—3.

Outer sleeve 22 is further provided with an anti-lateral movement latch member 60, which includes a pair of spring loaded ball and socket lock members 62. Referring to FIGS. 3 and 4, each lock member 62 includes a snap ring groove 64 which extends circumferentially about the ends of mid-portion 31 of outer sleeve 22, and a cross-drilled hole 66 extending inward from the O.D. of mid-portion 31 and through one of the splines 38, with a reduced diameter aperture 68 opening into bore 36. Aperture 68 is slightly smaller in diameter than cross-drilled hole 66, and between aperture 68 and the wall of hole 66 there is formed a cup-shaped annular seat 70. A ball 72 is disposed in cross-drilled hole 66, and a flat wire snap ring 74 is disposed within groove 64 and engaged on ball 72 and thus spring biases ball 72 against seat 70 to extend partially through aperture 68. Snap ring groove 64 is aligned over the center of cross-drilled hole 66, and sized to locate snap ring 74 entirely below the outer surface of mid-portion 31. One groove 64 and cross-drilled hole 66 is disposed adjacent each collar 30A, 30B.

Figure 2:
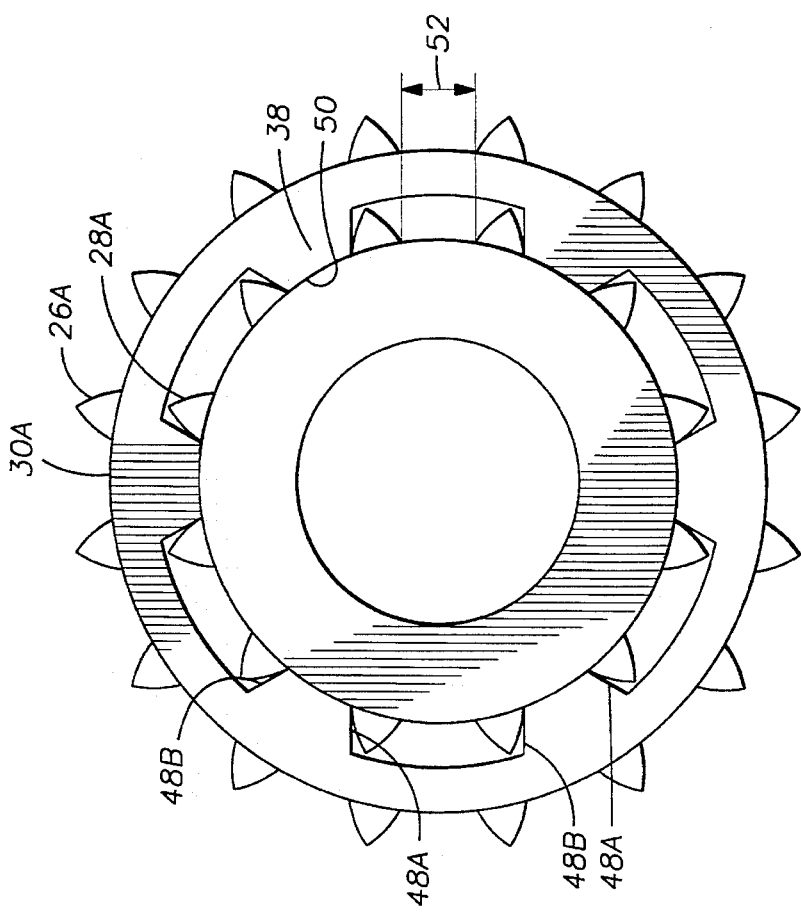
FIG. 2 is an end view of the interconnected sprockets of FIG. 1.

Referring now to FIGS. 1, 2 and 4, outer sleeve 22 is placed over inner sleeve 24, such that splines 38 are aligned between teeth 28A, 28B, on either collar 32A, 32B, until the ends 80A, 80B, 82A, 82B of each sleeve 22, 24 are aligned. As outer sleeve 22 is slipped over inner sleeve 24, balls 72 in each cross-drilled hole 66 slip over collars 32A or 32B between adjacent teeth 28A or 28B (depending on direction of travel of outer sleeve 22 with respect to inner sleeve 24), and when ends 80A, 80B, 82A, 82B are aligned, balls 72 extend slightly through aperture 68 and engage radius 43 on both collars 32A, 32B, providing a secure lateral engagement between sleeves 22, 24. Balls 72, apertures 68 and radii 43 are sized such that a secure grip exists between sleeves 22, 24 which may be overcome by the force of the operator's pulling outer sleeve 22 off of inner sleeve 24.

It should be appreciated that the sprocket assembly 20 of the present invention will permit quick, economical variation of sprocket sizes on projectors and other film handling equipment. The inner sprocket 24, which is securely attached to the projector shaft provides a secure stable platform upon which an outer sleeve 22 may be securely attached. The use of inner splines 38 spanning multiple teeth 28A or 28B on inner sleeve 24 permits relatively easy, inexpensive manufacture of the outer sleeve 22, and precision alignment to ensure tight engagement between splines 38 and teeth 28A, 28B. Additionally, the ball detent system of interlocking the sleeves 22, 24 enables relatively easy installation or removal of outer sleeve 22, while ensuring that outer sleeve 22 will remain securely on inner sleeve 24 when installed. Further, the balls 72, as biased against the radii 43 on inner sleeve 24, will cause all of the gap between sleeves 22, 24 created by the tolerancing of the parts to appear as a gap between the sleeves at the balls, and thus eliminate any intermittent eccentricity which would occur if the gap were free to move about the circumference of the sleeves.

Although a ⅓ sprocket assembly diameter and tooth ratio has been illustrated and described, numerous sprocket sizes and tooth configurations may be made in accordance with the invention. For example, the inner sleeve may be configured as a ten-tooth sprocket corresponding to a two-and-one-half perf per image frame system, and the outer sprocket may then include five equally spaced splines 38 to fit within the ten teeth. Additionally, multiple sized and toothed outer sprockets may be provided to mate to a single inner sprocket. The relatively easy interchangeability of outer sprockets on the inner sprocket will permit a theater or other projecting or processing facility to quickly change between formats with existing equipment.

We claim:

1. A sprocket assembly for converting a film projector or other film-handling device having at least one rotatable shaft for pulling film having evenly spaced perforations therein, comprising:

a first cylindrical sleeve having a central bore and a central cylindrical portion and opposed cylindrical end portions having evenly spaced first sprocket teeth thereon for engaging the perforations, said first sprocket teeth forming arcuate surfaces therebetween;

an aperture extending through said central cylindrical portion;

a connecting member disposed in said aperture and engageable against the rotatable shaft;

a second cylindrical sleeve insertable over said first cylindrical sleeve and having evenly spaced second sprocket teeth thereon to engage the perforations, said second sleeve including a through central bore having at least one spline disposed therein, said spline having side walls engaging the sides of two adjacent first sprocket teeth on said first sleeve between the root and crown of said teeth, and the other sides of said first sprocket teeth being disengaged from the second sleeve and said spline having an arcuate base extending between said side walls for matingly engaging said arcuate surface between said adjacent first sprocket teeth for providing an anti-rotational engagement therebetween; and interlocking members extending through bores in said one spline and engaging said opposed cylindrical end portions.

2. The sprocket assembly of claim 1, wherein said connecting member is a set screw and there being twice as many first sprocket teeth as splines.

3. The sprocket assembly of claim 2 wherein said second cylindrical sleeve further comprises opposed cylindrical end portions having said evenly spaced second sprocket teeth thereon to engage the perforations, and wherein the eccentricity between the circle defined by said second sleeve's through central bore and a circle defined by an end portion is no more than 0.0001 inch.

4. The sprocket assembly of claim 1 wherein said interlocking members disposed on said second cylindrical sleeve engage opposed surfaces on said first cylindrical sleeve to prevent said first cylindrical sleeve from moving longitudinally of said second cylindrical sleeve.

5. The sprocket assembly of claim 1 wherein said spline side walls engage the sides of two adjacent first sprocket teeth on said first sleeve between the root and a point below the crown of said teeth.

6. The sprocket assembly of claim 1, wherein said spline further comprises first and second side walls, each first side wall being parallel to the second side wall on a next adjacent spline.

7. The sprocket assembly of claim 1 wherein the diameter along said spline's arcuate base is about 0.001 inch greater than the diameter along the opposing arcuate surface disposed between said adjacent first sprocket teeth.

8. A sprocket assembly for converting a film projector or other film-handling device having at least one rotatable shaft for pulling film having evenly spaced perforations therein, comprising:

a first cylindrical sleeve received upon the rotatable shaft, said first cylindrical sleeve including a first cylindrical portion bounded by opposed annular surfaces formed by cylindrical ledge portions; first sprocket teeth disposed on the outer periphery of said ledge portions and sized and spaced to be received within the perforations;

a second sleeve received over said first sleeve, and including evenly spaced second gear teeth disposed around the circumference thereof at each end thereof and sized and spaced to receive the perforations and a central cylindrical portion disposed between said teeth; a plurality of splines projecting inwardly of said central cylindrical portion for receiving adjacent pairs of said first sprocket teeth on each of said ledge portions and a pair of bores extending inward of at least one of said splines and terminating at the interior wall of said second sleeve forming an aperture bounded by a seat; and an interlocking member received within each of said bores, a portion of said members extending through said apertures and engaging said opposed annular surfaces adjacent said first cylindrical portion for preventing a longitudinal movement of said second sleeve with respect to said first sleeve.

9. The sprocket system of claim 8, wherein each said interlocking member is a ball and a snap ring is disposed against each said ball to spring bias said ball in one of said bores against said seat.

10. The sprocket assembly of claim 8 further including splines on said second sleeve engaging said first sprocket teeth on said first sleeve to prevent relative rotation between said first and second sleeves.

11. The sprocket assembly of claim 8 wherein each said interlocking member springingly engages an opposed cylindrical ledge portion whereby intermittent eccentricity between said first and second sleeves is eliminated.

* * * * *